J. M. DICK.
Broiler.
No. 38,018. Patented March 24, 1863.
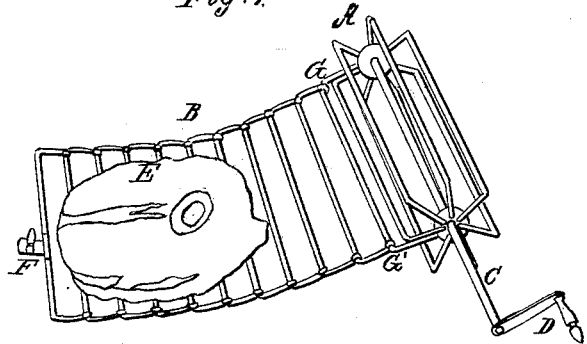
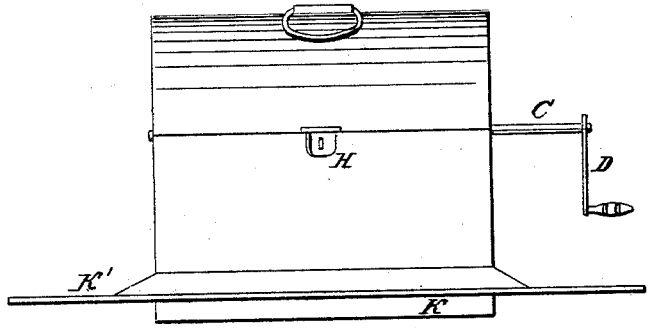
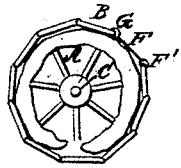
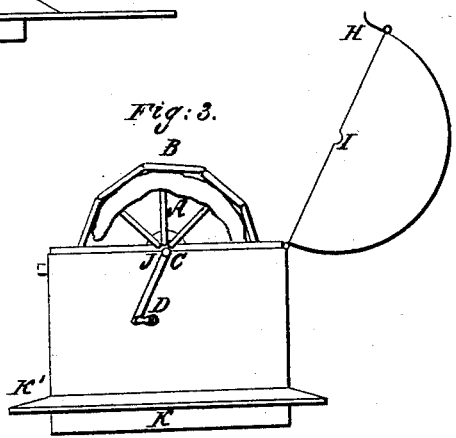
Witnesses:
Wm. F. Baade
James Sangster
Inventor:
James M. Dick

UNITED STATES PATENT OFFICE.

JAMES M. DICK, OF BUFFALO, NEW YORK.

IMPROVEMENT IN BROILERS.

Specification forming part of Letters Patent No. 38,018, dated March 24, 1863.

*To all whom it may concern:*

Be it known that I, JAMES M. DICK, of Buffalo, in Erie county, and State of New York, have invented certain new and useful Improvements in Steak-Broilers; and I do hereby declare that the following is a clear and exact description thereof, reference being had to the accompanying drawings, and the letters of reference marked thereon.

The same letters in the several figures in said drawings represent similar parts in each.

The nature of my invention consists in a frame or reel, with an outer jointed framework, so constructed as to surround or envelop said reel, the whole being so arranged that a steak or other meats may be securely held between the two frames and broiled while being made to revolve within the same. The said frame or reel is made to work within a drum or box, which may either be placed upon a stove or attached to and form part of a stove or furnace.

To enable others skilled in the art to make and use my invention, I will proceed to describe its construction and operation.

I construct my steak-broiler of cast and wrought iron or other suitable material.

Figure 1 represents a perspective view of the reel and flexible apron. A is the reel; C, the rod or axis upon which it revolves; D, the crank by which it is turned; B, the outside frame-work, which is attached to the reel at the points G and G' by a hinge or loop. This flexible apron B is so made that it may be wound around the reel A and then fastened by means of a clasp or spring, which is marked F. This spring or clasp is more plainly seen in Fig. 4. It is attached to one of the wires or part of the frame at the point F'. This reel is made to revolve within a box, O, as shown in Fig. 2, and is made to fit upon a cook stove or furnace. It is provided with a cover, which swings upon hinges at the back, and is fastened in front by a small clasp or suitable device, as shown at H in said Fig. 2. K represents a flange at the bottom of the box. It is formed to fit the opening in the stove. K' represents a second flange, which supports the box on the stove, and covers any opening which may be left around the flange K in said stove. The box is left open at the bottom so as to expose the revolving reel and meat to the fire. Fig. 3 represents an end view of said box, with the cover open, showing the position of the frame or reel inside. The object of this box is to confine the heat and vapors which arise in the process of cooking. It also allows the meat to be broiled as well in the blaze of the fire as by the coals, as the draft of the stove carries off the smoke. It is operated as follows: The outside framework is unwound from the reel until it assumes the position shown in Fig. 1. The steak is then put on, as also shown in Fig. 1. It is then, with the flexible apron B, wound around the reel. This flexible apron B is then fastened with the clasp F', as shown in Fig. 4, the whole then placed in the box. The rod or axis C fits into the notches J, made to receive it in each end of the box. The cover is then closed and fastened and the box placed on a stove or furnace and over a fire. The steak or meat is then broiled while being made to revolve by turning the crank D. The object of this revolving motion is to prevent the pieces of the meat from running off and to expose all parts of it to the heat. In this arrangement all the juices and flavor of the meat are preserved to greater degree than by any other process in use.

What I claim as my invention, and desire to secure by Letters Patent, is—

1. The flexible apron B, when constructed and operating as and for the purposes described.

2. The reel A, flexible apron B, and box O, when used in combination, for the purposes as described.

JAMES M. DICK.

Witnesses:
WM. F. BAADE,
JAMES SANGSTER.